(12) United States Patent
Dillon

(10) Patent No.: US 9,547,412 B1
(45) Date of Patent: Jan. 17, 2017

(54) USER INTERFACE CONFIGURATION TO AVOID UNDESIRED MOVEMENT EFFECTS

(71) Applicant: Amazon Technologies, Inc., Reno, NV (US)

(72) Inventor: Michael Dillon, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 474 days.

(21) Appl. No.: 14/230,083

(22) Filed: Mar. 31, 2014

(51) Int. Cl.
*G06F 3/00* (2006.01)
*G06F 3/0481* (2013.01)
*G06F 3/01* (2006.01)

(52) U.S. Cl.
CPC .................................. *G06F 3/04815* (2013.01)

(58) Field of Classification Search
None
See application file for complete search history.

(56) References Cited

U.S. PATENT DOCUMENTS

| | | | | |
|---|---|---|---|---|
| 8,947,323 | B1* | 2/2015 | Raffle | G09G 3/001 345/156 |
| 2010/0056277 | A1* | 3/2010 | Marks | A63F 13/00 463/36 |
| 2010/0281439 | A1* | 11/2010 | Markovic | G06F 3/016 715/863 |
| 2010/0306716 | A1* | 12/2010 | Perez | A63F 13/213 715/863 |
| 2011/0202880 | A1* | 8/2011 | Kawana | G06F 3/0482 715/830 |
| 2012/0242560 | A1* | 9/2012 | Nakada | G09G 3/3406 345/8 |
| 2013/0055150 | A1* | 2/2013 | Galor | G09G 5/34 715/784 |
| 2014/0267420 | A1* | 9/2014 | Schowengerdt | G06F 3/012 345/633 |
| 2015/0015487 | A1* | 1/2015 | Nakayama | G06F 3/012 345/156 |
| 2015/0149956 | A1* | 5/2015 | Kempinski | G06F 3/017 715/784 |
| 2015/0185855 | A1* | 7/2015 | Elak | G06F 3/0487 345/156 |
| 2015/0245017 | A1* | 8/2015 | Di Censo | H04N 13/0425 348/51 |
| 2015/0253845 | A1* | 9/2015 | Kempinski | G06F 3/013 345/156 |

* cited by examiner

*Primary Examiner* — Toan Vu
(74) *Attorney, Agent, or Firm* — Seyfarth Shaw LLP; Ilan Barzilay

(57) ABSTRACT

A device with a movement-based user interface (UI) may establish thresholds that govern when the UI moves and when the UI stays still to avoid interruptions to the user experience based on undesired movement, such as movement caused by a vehicle, etc. The thresholds may be based on detecting a movement type experienced by a device (e.g., bicycle, car, etc.). When movement is detected beyond the threshold the UI may be configured to smooth a displayed UI transition from a first position to a second position to improve the user experience.

18 Claims, 14 Drawing Sheets

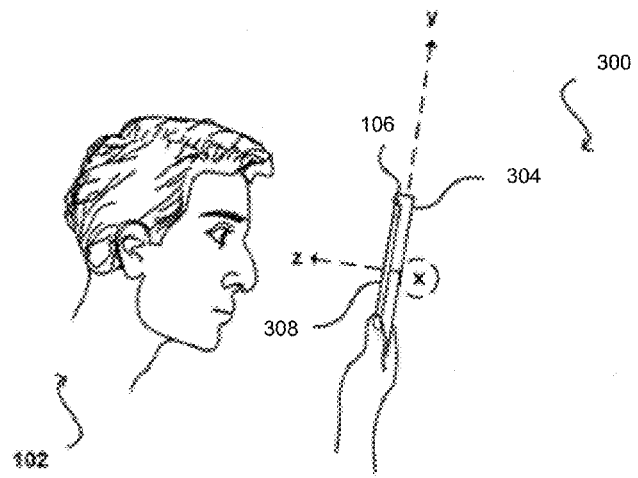
FIG. 3B
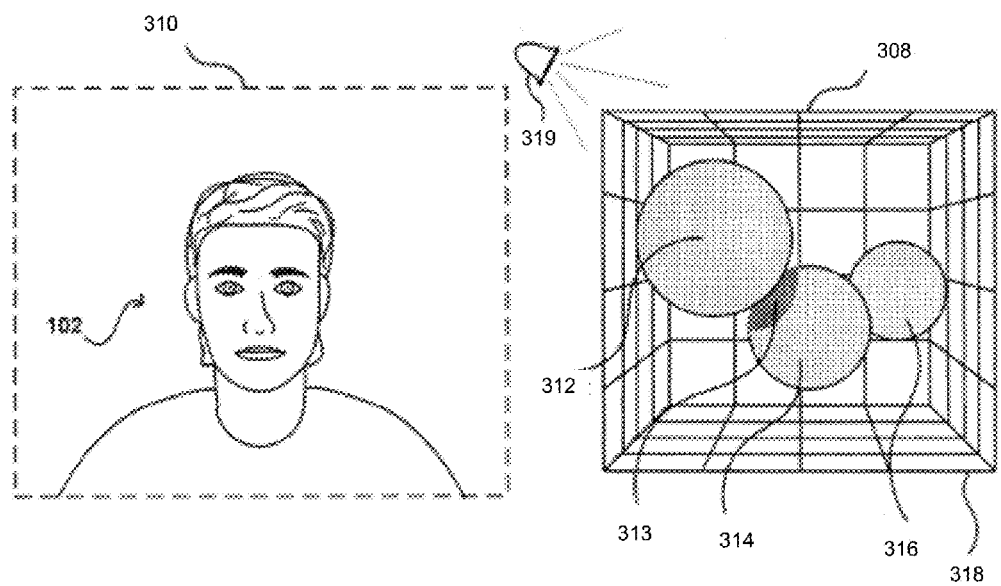
FIG. 3C
FIG. 3D

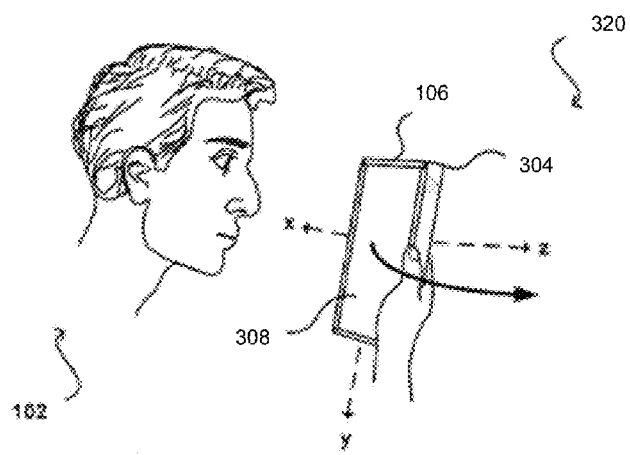
FIG. 3E
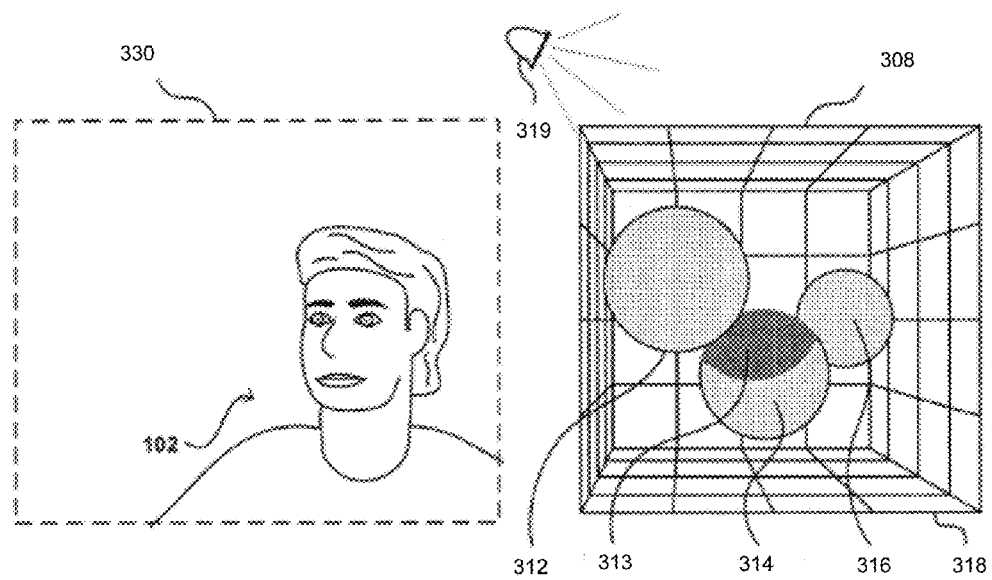
FIG. 3F
FIG. 3G

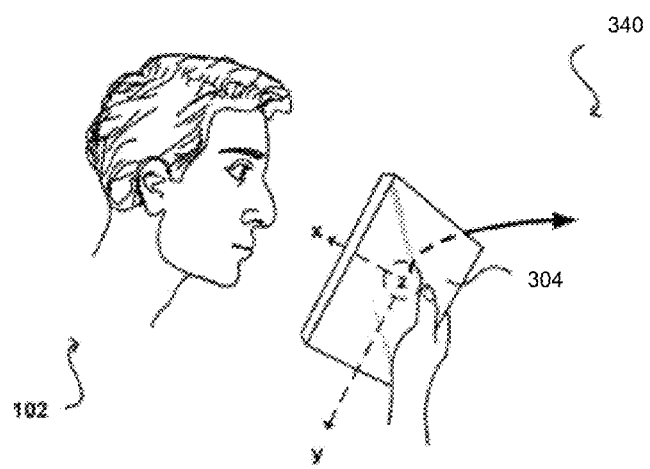
FIG. 3H
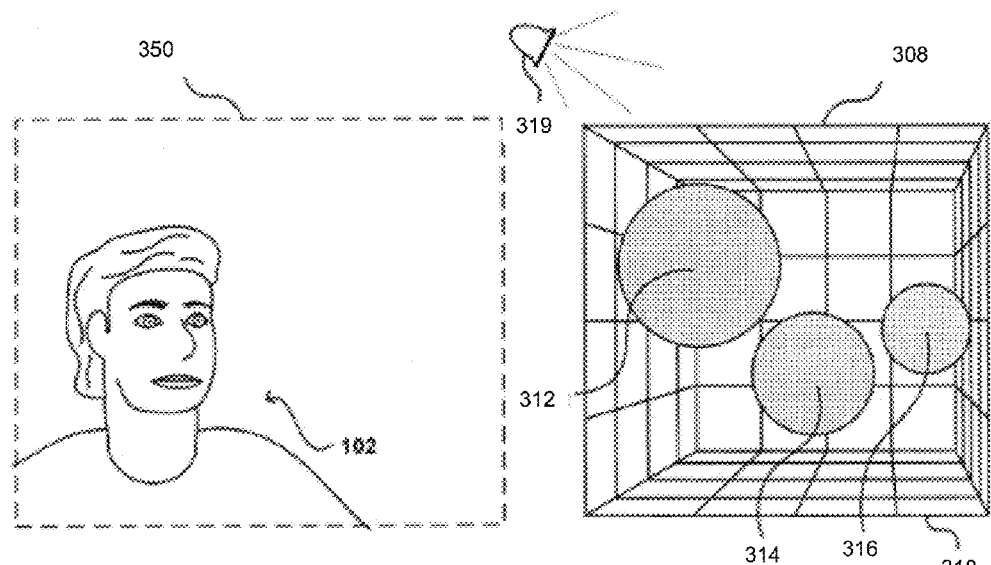
FIG. 3I
FIG. 3J

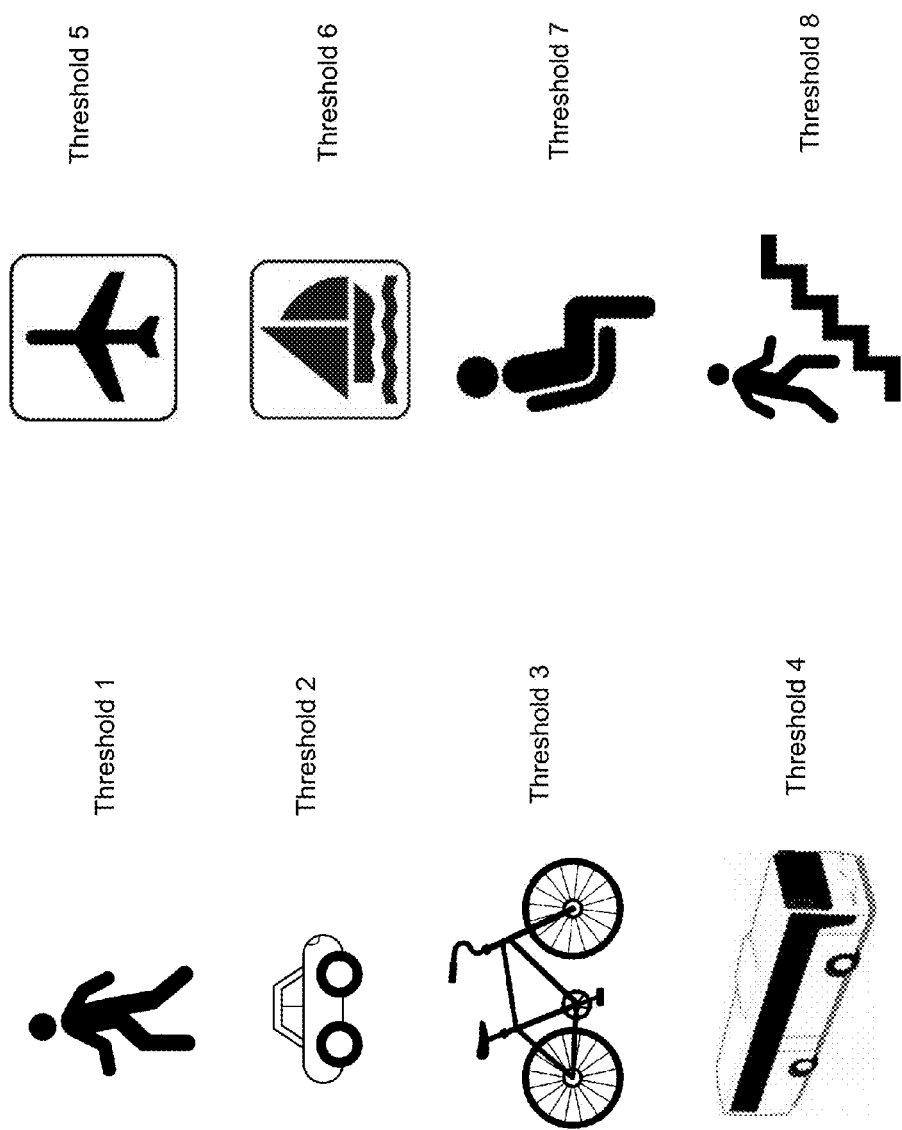

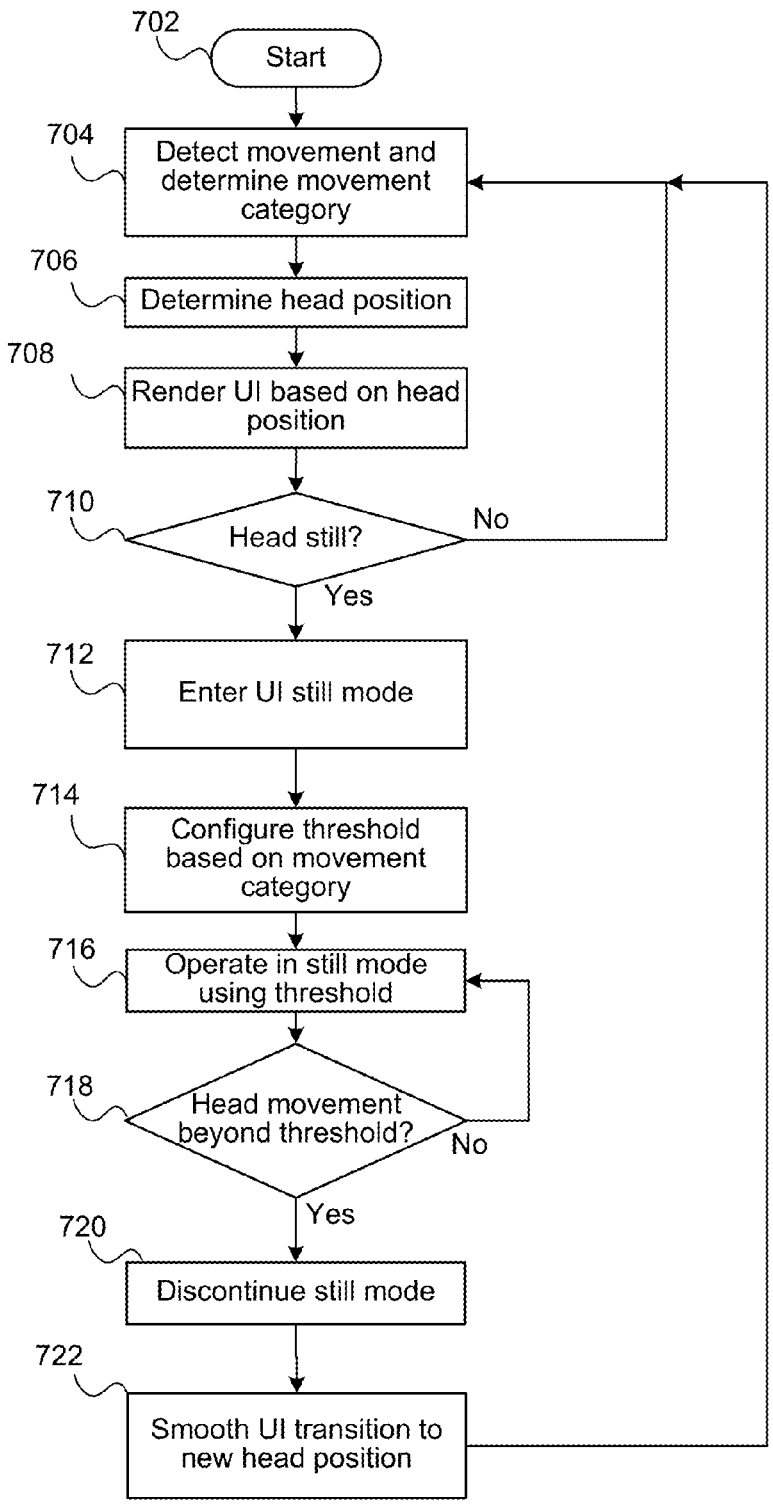

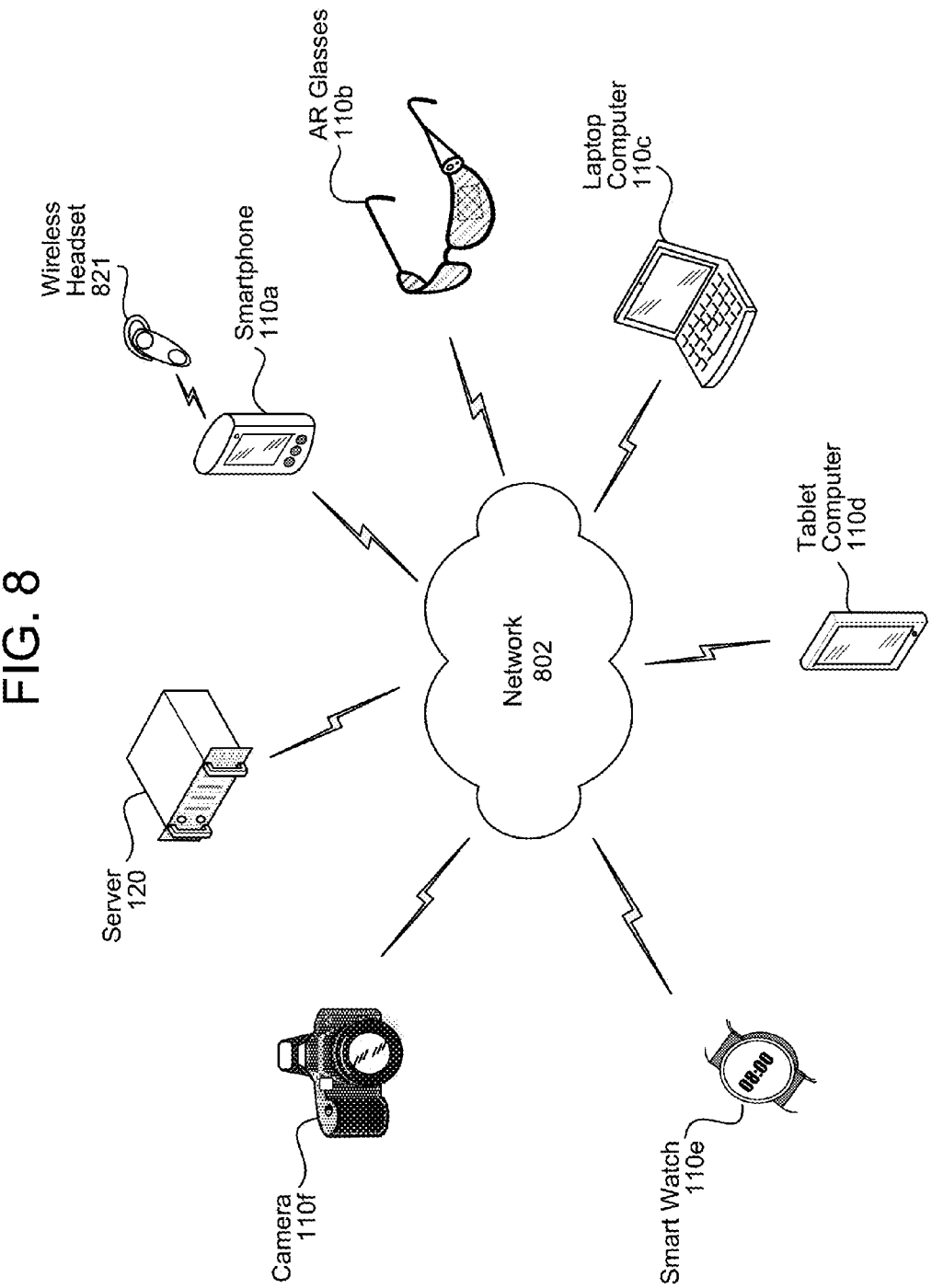

USER INTERFACE CONFIGURATION TO AVOID UNDESIRED MOVEMENT EFFECTS

BACKGROUND

Handheld electronic devices regular include navigation capability and often include features to determine device orientation or other internal sensors. Some devices have multiple radios, including WiFi and Bluetooth. Many also provide a graphical user interface (GUI) and touch screen via which the user may interact with the GUI.

BRIEF DESCRIPTION OF THE DRAWINGS

For a more complete understanding of the present disclosure, reference is now made to the following description taken in conjunction with the accompanying drawings.

FIGS. 3B-3J illustrate an example approach for providing a user interface that is based on tracking of a head or face of a user in accordance with one aspect of the present disclosure.

FIG. 6. illustrates applying motion signatures of different movement categories to movement thresholds to avoid undesired user interface movement according to one aspect of the present disclosure.

FIG. 7 is an example of an algorithm filtering undesired movement according to one aspect of the present disclosure.

FIG. 8 illustrates an example of a computer network.

DETAILED DESCRIPTION

Certain computing devices may be configured with position based user interfaces. Such position based user interfaces may alter their appearance based on a user position relative to the device operating the user interface (UI). Such devices may determine relative user position using a number of techniques, include head detection. If a user's head is detected directly in front a device, graphical elements of the UI (such as icons, images, etc.) may display normally (as in a head on view). When a user's head is detected askew from the device, for example to the left or right by some amount, the UI may alter its display to show graphical elements or other content of the UI as if from an angle. In this manner the UI may create certain visual effects such as three dimensional (3D) effects, parallax, depth of UI graphical elements, or other effects.

As certain unintended movement of the user relative to the device may result in undesired movement of the UI, embodiments of this invention address and minimize the impact of these types of movements.

To improve the user experience, a position based UI may be configured for operation based at least in part on a movement category of the user or the device. As detailed below, data from sensors of a device may be used to determine a movement signature of a device and compare that movement signature to known signatures of different movement categories. A movement signature may include data (such as from device sensors or other sources) relating to expected movement of a device associated with certain operating conditions/movement categories, as explained below. The operation of the UI may then be configured based on a movement category, such as by holding a UI display still and only engaging the movement aspects of the UI if the movement exceeds a configurable threshold. The configurable threshold may be based on movement of the user relative to the device, for example movement of the user's head relative to the device.

Figure 1:
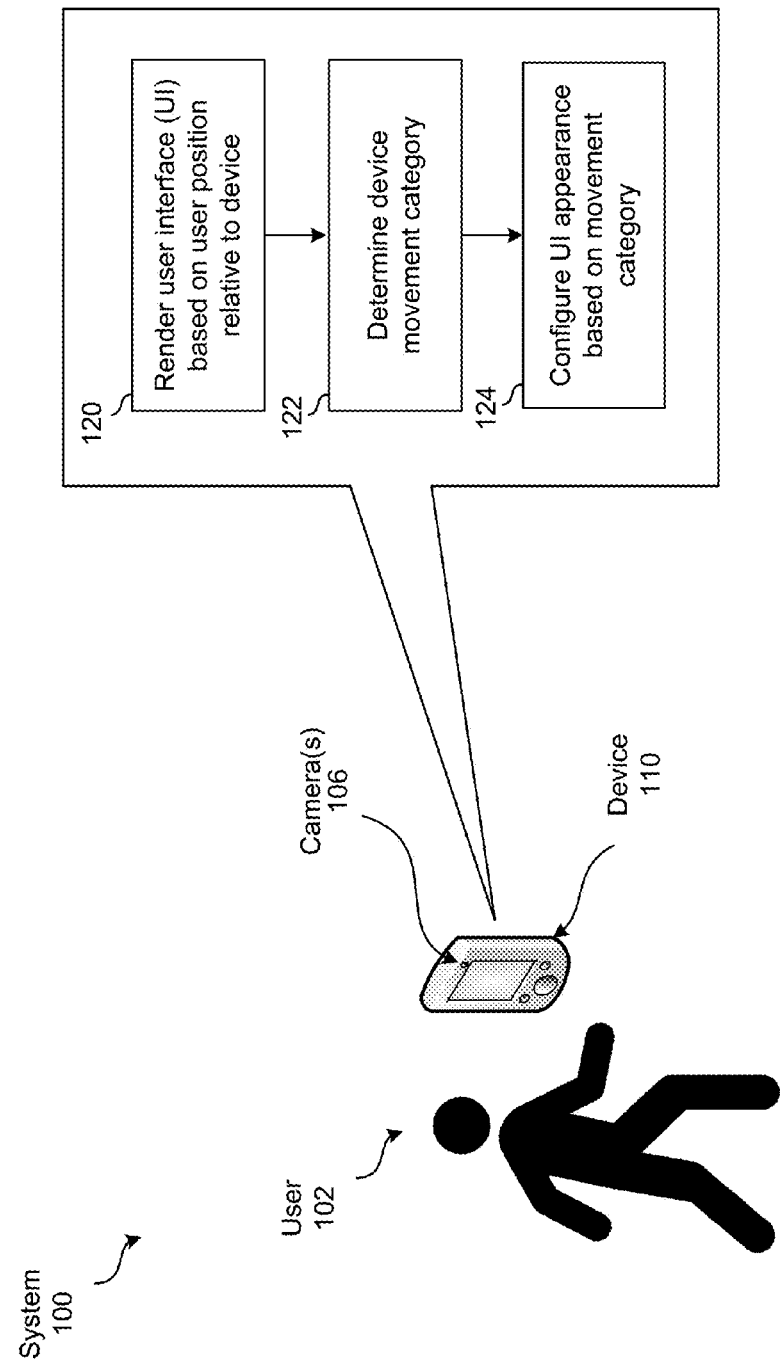
FIG. 1 illustrates an example of a device implementing a user interface to avoid undesired movement effects according to one aspect of the present invention.

As shown in FIG. 1, a system may include a device 110 with camera(s) 106 being operated by a user 102. The user 102 may be moving in some manner, for example by jogging. The device 110 may render (120) a UI based on the position of the user 102 relative to the device 110 as detected by the camera(s) 106. The device 110 may then determine (122) the movement category of the user (e.g., jogging). The device 110 may then configure (124) the appearance of UI elements based on the movement category of the user 102.

Various other applications, processes, and uses are presented below with respect to the various aspects.

Figure 2:
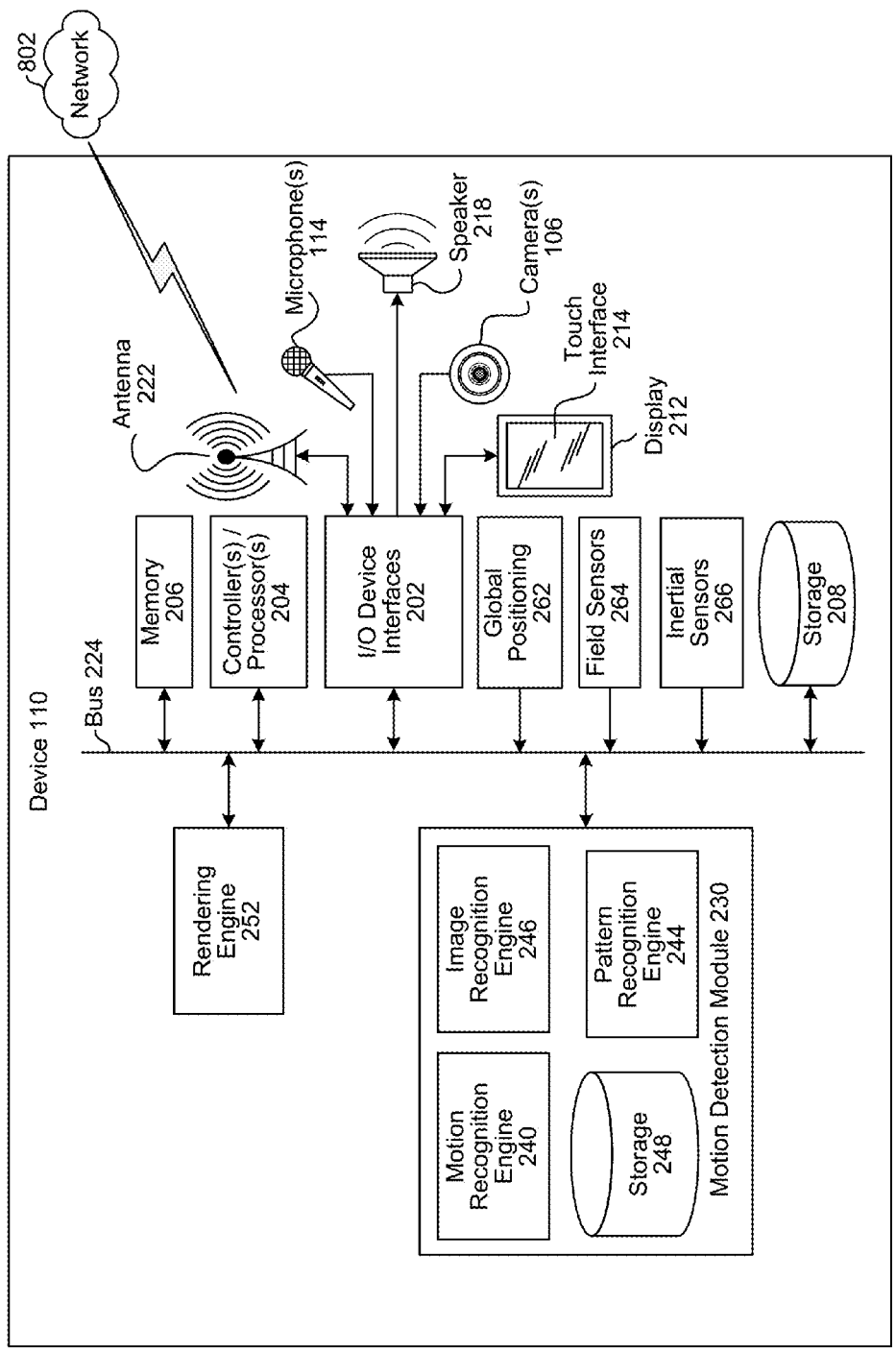
FIG. 2 is a block diagram conceptually illustrating example components of a mobile device according to one aspect of the present disclosure.

FIG. 2 illustrates a block diagram conceptually illustrating components of a system 100 to operate the movement threshold based user interface described herein. Depending upon how the system is structured, some of components shown in FIG. 2 as part of a device 110 may be included in a remote server. In operation, the system 100 may include computer-readable and computer-executable instructions that reside in storage 208 on the device 110. The device 110 may be a mobile device, such as a smart phone, tablet, smart watch, or the like.

The device 110 may include one or more controllers/processors 204 comprising one-or-more central processing units (CPUs) for processing data and computer-readable instructions, and a memory 206 for storing data and instructions. The memory 206 may include volatile random access memory (RAM), non-volatile read only memory (ROM), non-volatile magnetoresistive (MRAM) and/or other types of memory. The device 110 may also include a data storage component 208 for storing data and processor-executable instructions. The data storage component 208 may include one or more non-volatile storage types such as magnetic storage, optical storage, solid-state storage, etc. The device 110 may also be connected to a removable or external non-volatile memory and/or storage (such as a removable memory card, memory key drive, networked storage, etc.) through the input/output device interfaces 202.

Executable instructions for operating the device 110 and its various components may be executed by the controller(s)/processor(s) 204, using the memory 206 as temporary "working" storage at runtime. The executable instructions may be stored in a non-transitory manner in non-volatile memory 206, storage 208, or an external device. Alternatively, some or all of the executable instructions may be embedded in hardware or firmware in addition to or instead of software.

As shown in FIG. 2, the device 110 may include one or more of a variety of sensors. Among the sensors are an audio capture component such as microphone(s) 114, an image and/or video capture component such as camera(s) 106, a touch interface 214, an antenna 222, global positioning sensors 262, field sensors 264 (e.g., a 3-axis magnetometer, a gravity sensor), and inertial sensors 266 (e.g., a 3-axis accelerometer, a 3-axis gyroscope). The device 110 may also include one or more buttons 202 (not shown). Several of each of these components may be included. Also, although shown as integrated within device 110, some or parts of the various sensors may be external to device 110 (such as AR glasses 110b, wireless headset 821, etc.) and accessed through input/output device interfaces 202 either wirelessly or through a physical connection. The sensors may produce output data that may be used in determining movement signatures, as explained below.

The antenna 222 and related components (e.g., radio transmitter/receiver/transceiver, modem, etc.) may be configured to operate with a wireless local area network (WLAN) (such as WiFi), Bluetooth, and/or wireless networks, such as a Long Term Evolution (LTE) network, WiMAX network, 3G network, etc.

The audio capture component may be, for example, a microphone 114 or array of microphones, a wired headset (not illustrated), a wireless headset (e.g., wireless headset 821 in FIG. 8), etc. If an array of microphones is included, approximate distance to a sound's point of origin may be performed acoustic localization based on time and amplitude differences between sounds captured by different microphones of the array.

The touch interface 214 may be integrated with a surface of a display 212 or may be separate (e.g., a touch pad). The touch interface may be of any technology such as capacitive, resistive, optical/infrared, thermal/temperature, piezoelectric, etc. Other pointing devices for interacting with a graphical user interface (GUI) may be included, such as a touchpad, a trackball, or a mouse.

The global positioning module 262 provides an interface for acquiring location information, such as information from satellite geographic positioning system(s). For example, the global positioning module 262 may include a Global Positioning System (GPS) receiver and/or a Global Navigation Satellite System (GLONASS) receiver. The global positioning module 262 may also acquire location-based information using other radio sources (e.g., via antenna 222), such as mapping services that triangulate off of known WiFi service set identifiers (SSIDs) or cellular towers within range of the device 110.

The field sensor module 264 provides directional data. The field sensor module 264 may include a 3-axis magnetometer that measures magnetic fields and may serve as a compass. The field sensor module 264 may also include a dedicated gravity sensor to determine up-and-down.

The inertial sensor module 266 provides inertial data, and may include 3-axis accelerometer and a 3-axis gyroscope.

Examples of other sensors include an electronic thermometer to measure ambient temperature and a proximity sensor to detect whether there is an object within a certain distance of the device 110.

Sensors may be communicatively coupled with other components of system 100 via input/output (I/O) device interfaces 202 and/or via an address/data bus 224. The address/data bus 224 conveys data among components of the device 110. Each component within the device 110 may also be directly connected to other components in addition to (or instead of) being connected to other components across the bus 224.

The I/O device interfaces 202 may connect to a variety of components and networks. Among other things, the I/O device interfaces 202 may include an interface for an external peripheral device connection such as universal serial bus (USB), FireWire, Thunderbolt or other connection protocol. The input/output device interfaces 202 may also support a variety of networks via an Ethernet port and antenna 222.

The system 100 may also include a video output component for displaying images, such as display 212. The video output component may be a display of any suitable technology, such as a liquid crystal display, an organic light emitting diode display, electronic paper, an electrochromic display, a pico projector, etc. The video output component may be integrated into the device 110 or may be separate.

The system 100 may also include an audio output component such as a speaker 218, a wired headset (not illustrated), or a wireless headset (e.g., wireless headset 821). Other output devices include a haptic effect generator (not illustrated). The haptic effect generator may be of any haptic technology, including technologies to vibrate the entire device 110 (e.g., electromagnetic technologies such as vibratory motor or a coil with a central mass) and/or may comprise technologies allowing the haptic effect to be localized to a position of the touch interface 214, such as electroactive polymers, piezoelectrics, electrostatics, subsonic audio wave surface actuation, etc.

As discussed above, device 110 includes controller(s)/ processors 204, memory 206, and storage 208. In addition, the mobile device may include a motion detection module 230 and a rendering engine 252, each of which may comprise processor-executable instructions stored in storage 208 to be executed by controller(s)/processor(s) 204 (e.g., software, firmware), hardware, or some combination thereof. For example, components of the motion detection module 230 or rendering engine 252 may be part of a software application running in the foreground and/or background on the device 110. The rendering engine 252 actually renders, as in generates the appearance of, a graphical user interface.

The motion detection module 230 includes an image recognition engine 246, which utilizes the camera(s) 106 to determine an orientation or direction of motion of device 110 relative to a user 110. This will be discussed further below in connection with FIG. 3A. For example, the image recognition engine 246 may detect a position (including distance, angle, etc.) of a user's face or head relative to the device 110 and pass that information to the rendering engine 252 which will then render the user interface in a manner that positions the user interface based on the user's position relative to the device.

Figure 3A:
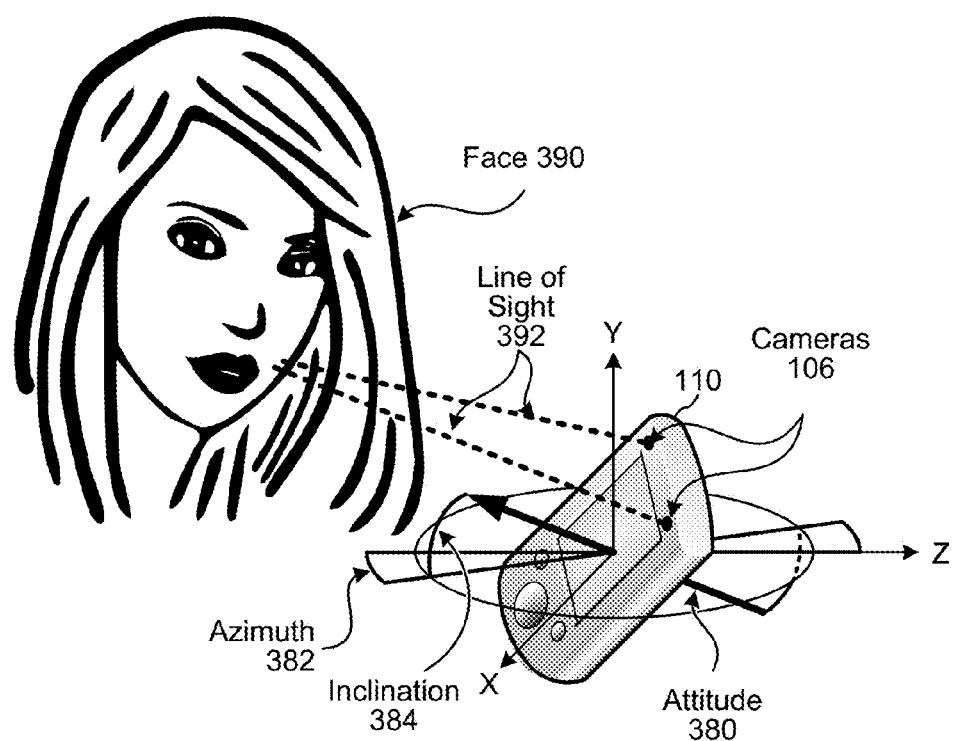
FIG. 3A illustrates using image processing to compute movement of a device according to one aspect of the present disclosure.

FIG. 3A illustrates the use of the camera(s) 106 to determine orientation of the device 110 relative to a face/ head 390 of a user. While the sensors may accurately detect orientation on the vertical axis (e.g., using the gravity vector) providing an accurate inclination 384, gyroscopic drift may result in an inaccurate azimuth 382. Over time, it may no longer be clear the orientation of the device relative to the user.

By taking an image with camera(s) 106, processing the image to perform detect the user's face/head 390 (in image recognition engine 246), and determining the position of the face/head relative to the line of sight 392 of the camera(s) 106 (for example, checking different cameras on the device 110), the attitude 380 of the device 110 relative to the user can be determined. If no face is apparent, image recognition engine 246 may check for other features. For example, if the device 110 is used as a phone without a hand-free earpiece, the recognition engine 246 can look for an ear, determine whether it is left or right, and thereby approximate device position relative to the user. Determination of the orientation/movement of a user's head relative to the device may be referred to as head tracking.

The position of the user/head may be determined based on the distance from the user to the device as well as based on the angle of the user/head relative to the device. To determine the user's distance and/or angular position relative to the device a number of techniques may be used. For example, the camera(s) 106 combined with the image recognition engine 246 may perform face or head detection using techniques described here and other known techniques. The rendering engine 252 may then render the UI based on the position of the user's face/head, for example using a projection matrix to render UI features as if the user's head is a camera projecting the UI. Thus the user interface may be rendered by rendering engine 252 to allow the user to experience the user interface as if viewing it from the determine relative position. Although FIG. 3A illustrates determine face/head angular position with regard to azimuth, inclination, and attitude, an XYZ coordinate system (such as that illustrated in FIG. 3A), or other mechanism for determining head/face angular position may be used. The angular position of the head may be determined relative to a reference point on the device, such as the center of the device, camera location, corner of the device, or other reference point. In another aspect, the angular position of the head may be determined relative to the plane of the display of the device, so that the display of the UI may move to align the user's view of the UI with the angle of the user's head relative to the plane of the device's display.

FIGS. 3B-3J illustrate an example approach for providing a user interface that is based on tracking of a head or face of a user in accordance with an embodiment. In the example situation 300 of FIG. 3B, a user 102 can be seen viewing a display screen 308 of a computing device 304. Although a portable computing device (e.g., a smart phone, tablet, or portable media player) is shown that can be held in the user's hands, it should be understood that other types of computing devices can utilize aspects of the various embodiments as should be apparent in light of the teachings and suggestions contained herein. The computing device can include at least one camera 106 located on the front of the device and the on same surface as the display screen to capture image data of subject matter facing the front of the device, such as the user 102 viewing the display screen. It should be understood that, while the components of the example device are shown to be on a "front" of the device, there can be similar or alternative components on the "top," "side," or "back" of the device as well (or instead). Further, directions such as "top," "side," and "back" are used for purposes of explanation and are not intended to require specific orientations unless otherwise stated. In some embodiments, a computing device may also include more than one camera on the front of the device and/or one or more cameras on the back (and/or sides) of the device capable of capturing image data facing the back surface (and/or top, bottom, or side surface) of the computing device. In this example, the camera 106 comprises a digital camera incorporating a CMOS image sensor. In other embodiments, a camera of a device can incorporate other types of image sensors (such as a charged couple device (CCD)) and/or can incorporate multiple cameras, including at least one wide-angle optical element, such as a fish eye lens, that enables the camera to capture images over a wide range of angles, such as 180 degrees or more. Further, each camera can comprise a digital still camera, configured to capture subsequent frames in rapid succession, or a video camera able to capture streaming video. In still other embodiments, a computing device can include other types of imaging elements, such as ambient light sensors, IR sensors, and other optical, light, imaging, or photon sensors.

As illustrated in FIG. 3C, when the user 102 positions the computing device in front of himself and gazes directly towards the display screen such that the x-y plane of the device is perpendicular or substantially perpendicular to the user's line of sight (where the lateral axis corresponds to the x-axis, the longitudinal axis corresponds to the y-axis, and the depth of the device corresponds to the z-axis), the image data captured by the front-facing camera of the device can include the image 310. Although one image is shown to be captured in this instance, it will be appreciated that multiple images captured by a same camera at successive times, multiple images captured by multiple cameras at the same time or substantially the same time, or some combination thereof can be analyzed in various embodiments. Further, other embodiments may additionally or alternatively use other approaches, such as proximity sensors, to determine the position of the user relative to the device and/or the viewing angle of the user with respect to the device. In this example, the device is capable of rendering one or more graphical elements for display on the two-dimensional display screen according to a viewing angle of the user with respect to the display screen. The device can rely on the position of the head or face of the user with respect to the device and/or the apparent motion of the user's head or face with respect to the device to draw or render one or more graphical elements on the display screen so as to simulate depth.

FIG. 3D illustrates an example of a user interface presented on the display screen 308 based on the user's viewing angle with respect to the device. The user interface includes three user interface elements 312, 314, and 316 displayed within a 3D grid 318. UI elements 312, 314, and 316 may be buttons for a user application that would normally appear to be the same size and shape to the user. However, here, UI elements 312, 314, and 316 have each been scaled to give the user the impression that the UI elements are associated with different depths. In particular, UI element 312 appears to be at a depth closest to the user and corresponds to a largest scale, UI element 314 appears to be positioned at an intermediate depth and corresponds to an intermediate scale, and UI element 316 appears to be at depth furthest away from the user and corresponds to the smallest scale. It will be appreciated that other transformations can also be applied to UI elements to simulate depth, including rotations, translations, perspective projections, among other transformations. To further enhance an impression that the user interface has depth, a virtual light source 319 may be positioned off-screen at the top left corner of a 3D grid-box 318. As mentioned, the shadows generated by a virtual light source can depend on the color, intensity, direction, position, and/or falloff function of the light source. Further, the light source can be modeled as a directional light, a point light, or a spotlight. A directional light is produced by a light source at an infinite distance from the scene and all of the rays emanating from the light source strike UI elements from a single parallel direction and with equal intensity everywhere. A point light, as in the example of FIG. 3D, is a light that gives off equal amounts of light in all directions. UI elements closer to the light may appear brighter than those further away. A spotlight is a light that radiates light in a cone with more light emanating from the center of the cone and gradually tapering off the further the away from the center. Modeling a light source based on one of a directional light, point light, or spotlight is known to those of ordinary skill in the art, and will not be discussed in detail herein. In some embodiments, the virtual light source may not be fixed as in the example of FIGS. 3D, 3G, and 3J. Instead, the virtual light source may be positioned with respect to a user and/or a computing device such that when the user and/or computing device move, the virtual light source also moves with the user and/or computing device.

In FIG. 3E, an example situation 320 illustrates that the user 102 has tilted the computing device 304 to the right with respect to the user, i.e., the user has rotated the device to his right along the longitudinal or y-axis. As seen in FIG. 3F, the tilt or rotation of the device causes the camera to capture a different view or perspective of the user within image 330, here, a three-quarters profile of the head or face of the user facing leftward. The position of the user's face may also be shifted towards a right region of the image 330 because of the rightward tilt or rotation of the device. In this example, the apparent motion of the face or head of the user (which may be primarily due to the motion of the device) can be tracked from the initial position detected in FIG. 3C to the new position depicted in FIG. 3F. Based on the apparent movement of the user's head or face, the user interface can be redrawn or rendered for display to correspond to the new viewing angle of the user 102. For example, as illustrated in FIG. 3G, when the user tilts the device rightward, the device will apply rotations, scales, translations, perspective projections, among other transformations, to elements 312, 314, 316, and 318 based on the new viewing angle of the user. In particular, 3D grid 318 has been skewed such that the right face of the grid appears more prominently in the display screen 308 while the left face of the grid is presented at more of an oblique angle when the user rotates the device laterally to the right. UI elements 312, 314, and 316 are also redrawn or rendered to correspond to the new viewing angle of the user with respect to the device. Further, shadow 313 has been recast to be consistent with the off-screen virtual light source 319 and the transformed UI elements 312 and 314 such that shadow 313 appears much larger in FIG. 3G than in FIG. 3D.

FIG. 3H illustrates an example situation 340 wherein the user 102 has tilted the computing device 304 to the left with respect to the user, i.e., the user has rotated the device to his left along the longitudinal or y-axis. As seen in the image 350 of FIG. 3I, the tilt or rotation of the device causes the camera to capture a three-quarters profile of the head or face of the user facing rightward, and the position of the user's face has also shifted towards a left region of the image 350. In this example, the apparent movement of the face or head of the user (which, again, may be primarily due to the movement of the device) can be tracked from the previous position depicted in FIG. 3F to the new position depicted in FIG. 3I. The UI elements 312, 314, 316, and 318 can be redrawn or rendered for display based on the apparent motion of the user's head or face as seen in FIG. 3J. For example, the user may be positioned as depicted in FIGS. 3E (and 3F) and may subsequently tilt the device laterally towards his left until the user's viewing angle is perpendicular or substantially perpendicular with respect to the device as depicted in FIGS. 3B (and 3C) (e.g., the user's initial position). The UI elements presented on the display screen 308 may be rendered or animated from what is seen in FIG. 3G to what is seen in FIG. 3D. In particular, the 3D grid 318 may be unskewed or otherwise transformed, UI elements 312, 314, and 316 may be rotated, translated, scaled, or otherwise transformed back to their original projections, and shadow 313 may be recast to correspond to the position of the virtual light source 319 and/or the original projections of UI elements 312 and 314. It will be appreciated that in various embodiments, interim user positions between when the user is positioned as seen in FIGS. 3E (and 3F) and when the user is positioned as seen in FIGS. 3B (and 3C) can be detected by the device. Interim transformations can be applied to the UI elements such that there may be a smooth animation effect for the transformation of the UI elements as seen in FIG. 3G to the UI elements as seen in FIG. 3D.

As the user continues rotating the device towards his left, the user interface may transform and/or be animated from the scene depicted in FIG. 3D to the scene depicted in FIG. 3J. In particular, the 3D grid 318 may be rendered such that the left face of the grid is presented more prominently and the right face of the grid is displayed at a more oblique angle, and UI elements 312, 314, and 316 may also be rotated, translated, scaled, or otherwise transformed in accordance with the new viewing angle of the user as seen in FIGS. 3H and 3I. In this example, the new viewing angle of the user causes UI elements 312, 314, and 316 to be rendered such that they no longer overlap. As a result, UI element 312 no longer casts a shadow on UI element 314. It will be appreciated that the head or face of the user can generally be tracked according to six degrees of freedom (e.g., motion along the x-, y-, and z-axes or forward/backward, up/down, and left/right, and rotation along the x-, y-, and z-axes or pitch, yaw, and roll) and the device can be configured to appropriately respond to such various motions. For example, when the user tilts the device backwards and to his right (i.e., such that the top left corner of the device is the closest point of the device to the user), the right and bottom faces of the 3D grid 318 may be displayed more prominently and the left and top faces may be displayed less prominently. When the user tilts the device forward and towards his left (i.e., such that the bottom right corner of the device is the closest point of the device to the user), the left and top faces of the grid can be displayed with greater detail, and the right and bottom faces may be presented with fewer details. Such an approach may give a user an impression that he is interacting with the UI elements in an environment having 3D depth.

Figure 4A:
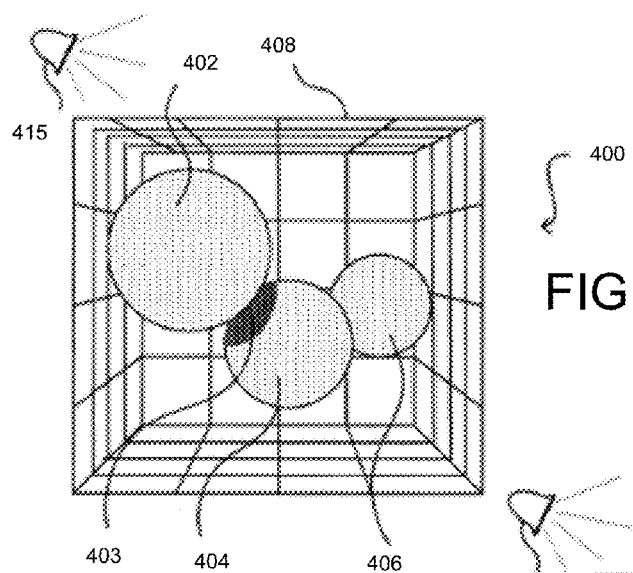
FIGS. 4A-4C illustrate an example approach for dynamically updating simulated depth for user interface elements in accordance with one aspect of the present disclosure.
Figure 4B:
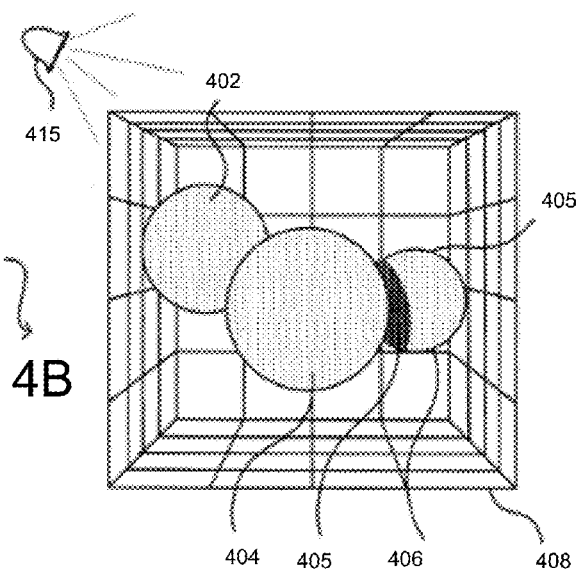
Figure 4C:
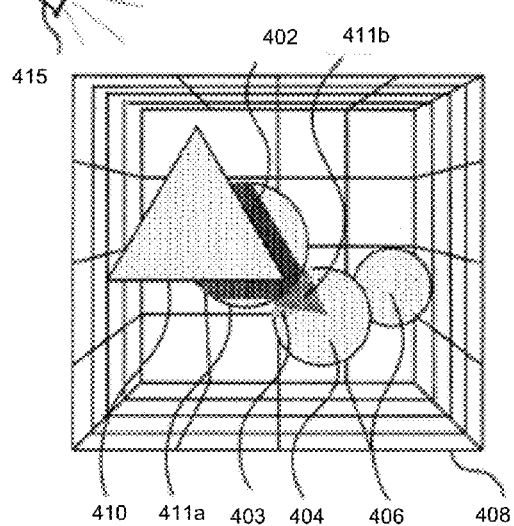

FIGS. 4A-4C illustrate an example approach of dynamically modifying the depths of UI elements in accordance with an embodiment. In FIG. 4A, an example 400 of a user interface similar to that of FIGS. 3D, 3G, and 3J is shown. The user interface includes three UI elements 402, 404, and 406 displayed within a 3D grid 408. Each of the UI elements 402, 404, 406 would normally appear to be similar in size and shape but have been transformed according to at least a scale to give a user an impression of depth. This impression of depth may be referred to as a "virtual depth." Although UI elements are described herein as having "depth," for the present discussion, a discussed "depth" of a UI element means a "virtual depth" as displayed on a display of a device. Thus while the user may view the UI element as having a depth, such depth of a UI element is virtual. In particular, UI element 402 corresponds to a depth closest to the user and a largest scale, UI element 404 corresponds to an intermediate depth and an intermediate scale, and UI element 406 corresponds to depth furthest away from the user and a smallest scale. As mentioned, other transformations can also be applied to simulate 3D depth, such as rotations, translations, perspective projections, among other possibilities. In this example, UI element 402 can be seen overlapping an upper left portion of UI element 404, and UI element 404 can be seen overlapping a lower left portion of UI element 406. A fixed virtual light source 415 may be positioned off-screen at the upper left corner of the grid 408 such that UI element 402 casts a shadow 403 upon UI element 404. However, UI element 404 does not cast a shadow on UI element 406 because UI element 404 is positioned lower horizontally than UI element 406.

FIG. 4B illustrates an example 420 of the user interface after the user has interacted with the UI or the UI has otherwise received other input to change the state of each UI element. For instance, the UI elements could correspond to a portion of an alphanumeric keypad that uses depth cues for suggesting the most likely next key for the user to enter. After the user enters a portion of a text or a number, the device may present the next alphanumeric or numeric key corresponding to a text suggestion or number suggestion that the user is most likely attempting to enter into the computing device. The device can emphasize the next key by displaying the key at a depth closest to the user, and the device can de-emphasize other keys by positioning the other keys at depths further away from the user. Thus, in this example, UI element 404 is brought to a depth closest to the user and UI element 402 is pushed down to a lower depth. This is shown by the scale of UI element 404 being increased to the largest scale and the scale of UI element 402 being decreased to an intermediate scale. To further enhance an impression of depth of the UI, the transformations of UI elements 402 and 404 also result in UI element 404 casting a shadow 405 on UI element 406, and UI element 402 no longer casting a shadow on UI element 404.

FIG. 4C illustrates an example 440 of the user interface after the user has interacted with the UI or the UI has otherwise received other input to change the state of the UI. In this example, UI elements 402, 404, and 406 may represent components of one or more first executing user applications. The user may start up a second user application that includes UI element 410. The second user application may then obtain focus as depicted in UI element 410 being displayed at the depth perceived to be closest to the user. UI element 402, 404, and 406 can be pushed to a lower depth, which can be depicted by scaling the elements to a smaller scale and diffusing the intensity of shadows at lower depths. For example, the shadow 411a cast by UI element 410 on UI element 402 appears darker than the shadow 403 cast by UI element 402 on UI element 404 because of the relative depths of UI elements 402, 404, and 410. In this example, UI element 410 may also cast a shadow 411b on UI element 404, but at a different offset, shadow-casting angle, and/or intensity than the shadow cast on UI element 402 because of the differences in the depths of UI elements 410, 402, and 404. In particular, shadow 411b can be seen at a different offset and angle from shadow 411a, and shadow 411b is slightly darker than shadow 403. In some embodiments, the merger of shadows, can also cause the merged portion to appear more intense than it would otherwise if the shadows do not merge.

Figure 4D:
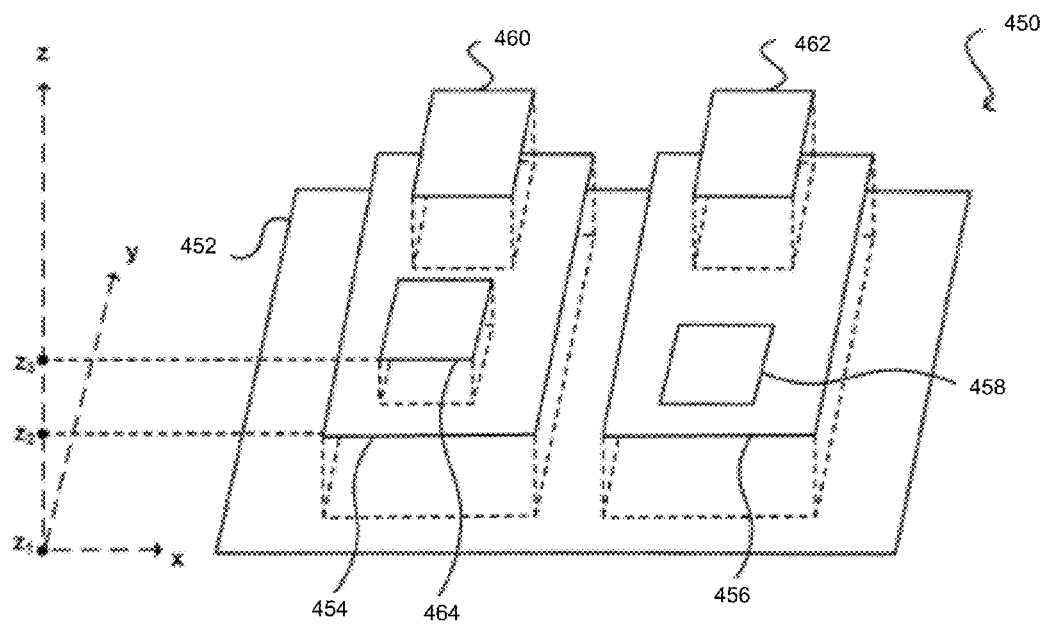
FIGS. 4D-4H illustrate an example user interface that simulates depth in accordance with one aspect of the present disclosure.

FIG. 4D illustrates an example 450 of a user interface displayed based upon a first viewing angle of a user in accordance with an embodiment. The example UI includes multiple user interface elements arranged at various depths. In particular, the UI elements are arranged according to three different depths, $z_0$, $z_1$, and $z_2$. At the lowest depth $z_0$ or the depth appearing to be furthest away from a user (and/or the display screen) is UI element 452. At the intermediate depth z1 are UI elements 454, 456, and 458. UI element 458 is contained within UI element 456. At the highest depth z2 or the depth appearing to be closest to a user (and/or the display screen) are UI elements 460, 462, and 464. In this example, UI elements 454 and 456 can be thought of as the "children" of UI element 452, UI elements 460 and 464 can be characterized as the children of UI element 454, and UI elements 458 and 462 are the children of UI element 456. UI elements 458, 460, 462, and 464 can be thought of as the "grandchildren" of UI element 452. Thus, UI elements 452, 454, 456, 458, 460, 462, and 464 can be represented as a UI hierarchy with UI element 452 as a root of the hierarchy, UI elements 454 and 456 as branches of the root, and UI elements 458, 460, 462, and 464 as leaves of the hierarchy, with UI elements 460 and 464 branching from UI element 454 and UI elements 458 and 462 branching from UI element 456. It will be appreciated by those of ordinary skill in the art that a user interface could have fewer or greater depths and/or fewer or greater UI elements than are illustrated in FIG. 4D. Thus, the depiction of the user interface 450 in FIG. 4D should be taken as being illustrative in nature and not limiting to the scope of the disclosure.

In various embodiments, each of the UI elements can be associated with presentation information such as a position and dimensions, including for example, x, y, and z coordinates defining an origin and a width and height for a planar UI element, x, y, and z coordinates defining the origin and a width, height, and depth for a rectangular cuboid UI element, or x, y, and z coordinates of vertices of a complex 3D UI element. It will be appreciated that UI elements can be represented as other primitive 2D or 3D geometric shapes, such as circles, triangles, polygons, spheres, pyramids, prisms, among others, or custom shapes defined by their vertices in other embodiments. The position and dimensions of each UI element can be used by a computing device to measure, layout, and/or draw the UI element based on the position of the face or head or user with respect to the computing device and/or the motion/orientation of the device to give the user an impression that he is interacting with the UI element in an environment having 3D depth. In addition, the position and dimensions of the UI element can be used to cast shadows based on an intersection of light from a virtual light source with the UI element to further enhance simulated 3D depth.

Figure 4E:
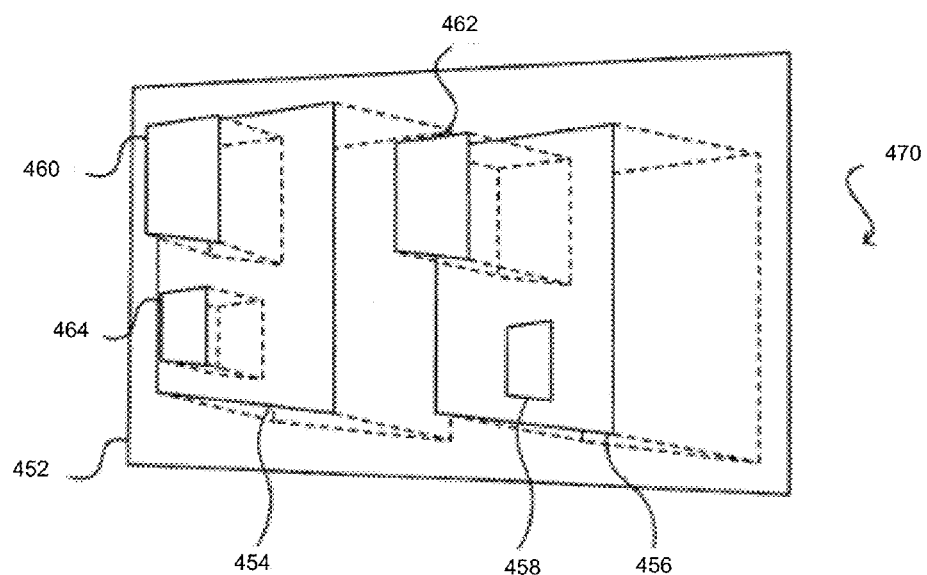

FIG. 4E illustrates an example 470 of the user interface at a second viewing angle of the user. In this example, the user has rotated the computing device laterally to the left (e.g., leftward along the y-axis). Such user interaction or input event may be monitored via an "event listener" associated with one or more of the UI elements. Upon detection of the input event, a callback function of the event listener may be invoked to cause the UI hierarchy to be redrawn or rendered to correspond to a new viewing angle of the user. In this example, UI elements 452, 454, 456, 458, 460, 462, and 464 can each be transformed according to a rotation, scale, translation, perspective projection, among other possibilities, based on the new viewing angle of the user so as to give the appearance that the UI elements exist in an environment having 3D depth. This can be demonstrated by the transformation of UI element 462, which can now be seen partially obscuring a portion of UI element 452 beneath UI element 454 which had not previously been obscured.

Figure 4F:
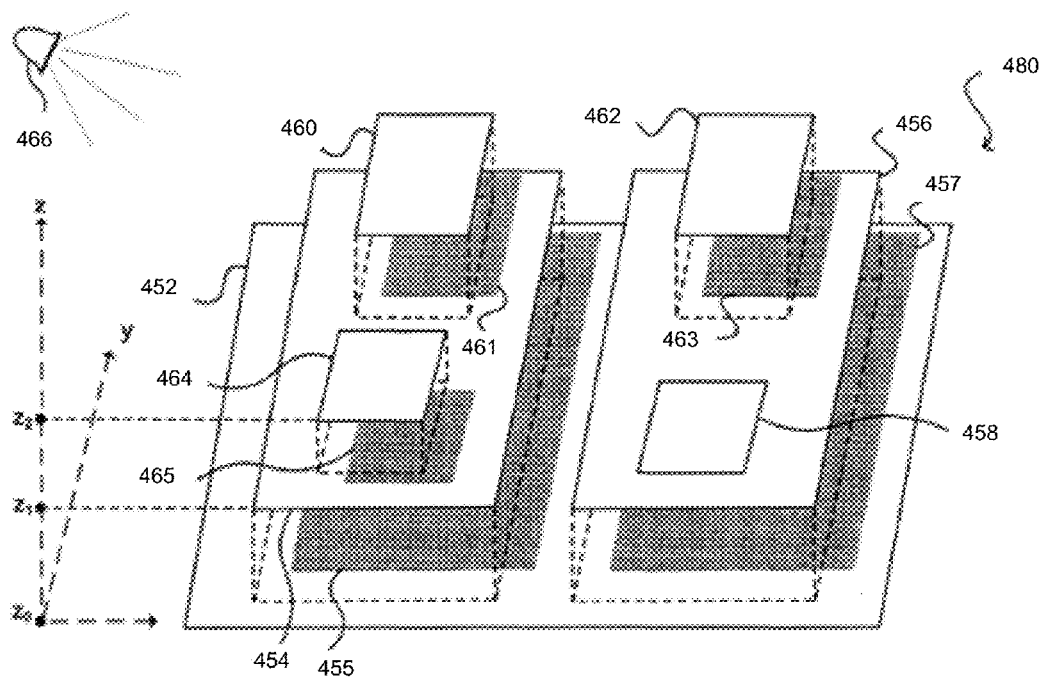

As mentioned, to further enhance an impression that a UI environment is associated with 3D depth, one or more UI elements can each be configured to cast a shadow based on the position and dimensions of the UI element, the properties of a virtual light source, and the position and dimensions of other UI elements upon which the shadow may be cast. FIG. 4F illustrates an example 480 of the user interface in which multiple UI elements have been configured to receive and/or cast shadows in accordance with an embodiment. In this example, a virtual light source 466 may be located off-screen at the upper left corner of a display screen presenting the UI. At the highest depth z3, UI elements 460 and 464 each cast a shadow 461 and 465, respectively, on their parent, UI element 454. Further, UI element 462 casts a shadow 463 on its parent, UI element 456. At the intermediate depth z2, UI element 458 does not cast a shadow on its parent because it is positioned flush (e.g., at the same depth) with respect to its parent, UI element 456. UI elements 454 and 456, however, each cast a shadow 455 and 457, respectively, on their parent, UI element 452. In this example, UI elements 452, 454, and 456 are shadow receivers as shadows are casted upon them by their children. UI elements 454, 456, 460, 462, and 464 are shadow casters as they cast shadows upon their parents. As can be seen with UI elements 454 and 456, a UI element can be both a shadow caster and a shadow receiver.

Figure 4G:
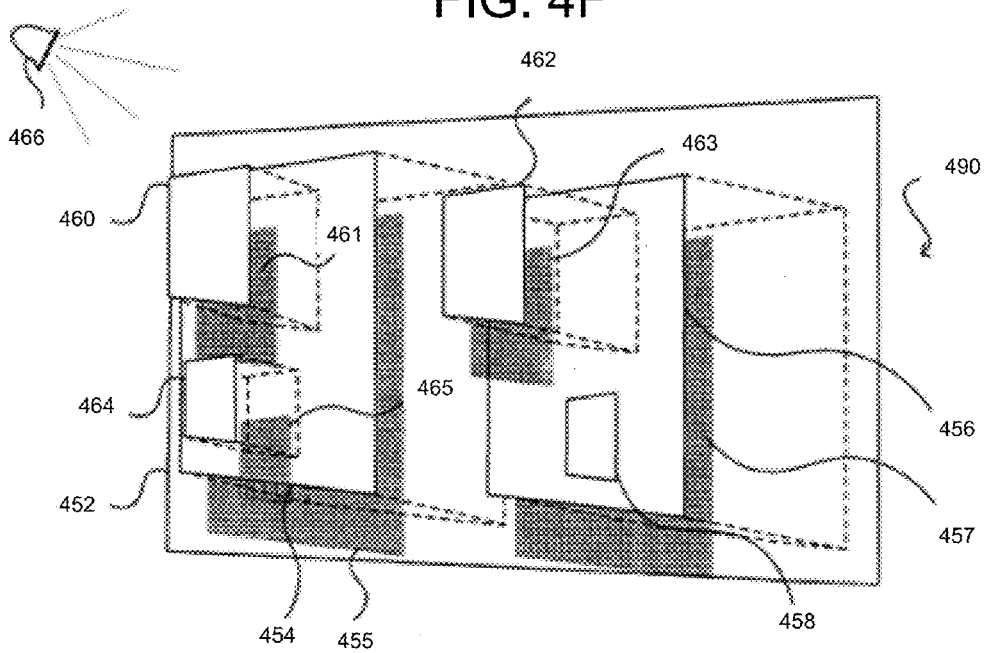

As the position of the user relative to the device and/or the motion/orientation of the device changes, transformations (e.g., rotation, scale, translation, perspective projection, etc.) can be applied to the UI elements to account for the new viewing angle of the user with respect to the device. Further, shadows can be redrawn or rendered according to the transformations of the UI elements and the properties of the virtual light source. FIG. 4G illustrates an example 490 of the user interface wherein the UI elements have been transformed based upon the new viewing angle of the user and shadows have been recast according to the dimensions of the transformed UI elements and the properties of the virtual light source. In this example, as the UI elements 452, 454, 456, 458, 460, 462, and 464 are transformed based upon the new viewing angle of the user, the respective shadows for shadow casting UI elements 454, 456, 460, 462, and 464 can also be redrawn or rendered to conform to the transformations of these elements' parents and/or the position and other characteristics of the virtual light source. The ability to recast shadows in a realistic manner can enhance the user's interactions with a user interface such as by providing cues as to how the user's behavior may affect the operation of a computing device.

Figure 4H:
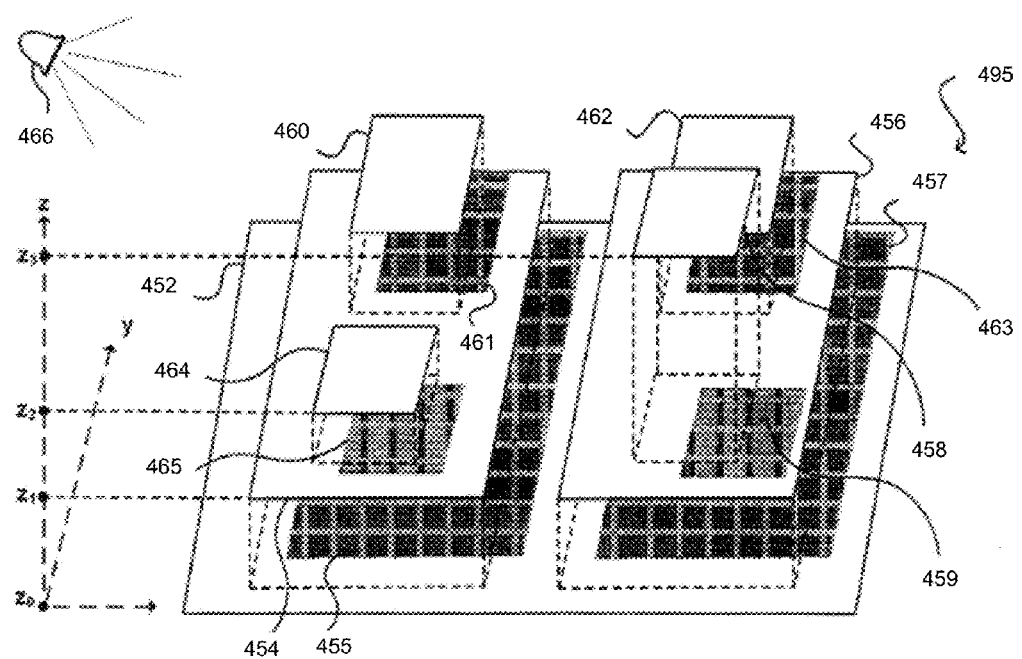

FIG. 4H illustrates an example 495 of the user interface in which the depth of UI element 458 changes as a result of a user interacting with the UI or the UI otherwise receiving another input to change the state of the UI element. For example, the UI may be a product catalog displaying product information in a grid layout. UI element 458, as seen in FIG. 4D, may have initially been de-emphasized because there was no inventory for the product associated with UI element 458. In FIG. 4H, the inventory for the product associated with UI element 458 may be replenished. Further, there may be a sale for the product such that the depth of UI element 458 is elevated from depth z1 to a new depth z3. As mentioned, when there is a new 3D depth established within a UI framework, the UI framework may update state information with the new depth and the dimensions of the UI element positioned at the new depth. In this example, UI element 458 did not previously cast a shadow. However, in other situations where the depth of a UI element has changed and the UI element previously cast shadows, it will be appreciated that the previous shadows can be updated or removed based on the new depth of the UI element. Further, if the UI element previously received shadows, these shadows can also be updated or removed. After the shadows cast or received by the UI element have been updated or removed, the shadows cast and received by the UI element at the new depth can be determined Here, as a result in the change in the depth of UI element 458, the UI element can be seen casting a shadow 459 on parent UI element. In this example, shadow 459 is offset further to the right than shadows 461, 463, and 465 because its corresponding shadow-caster, UI element 458, is positioned at a higher depth than the corresponding shadow-casters for shadows 461, 463, and 465, UI element 460, 462, and 464, respectively. In other embodiments, the angle of the shadows, intensity, among other parameters, can be used to convey relative depth information.

The rendering engine 252 may re-render the appearance of a UI according to a configured refresh rate. The refresh rate may be set to re-render the UI many times per second (for example, 60 times per second) so that UI re-rendering is seamless from the user's perspective. The appearance of UI features may change quickly depending on the speed of movement of the user relative to the device. Further, if the user or device is moved unexpectedly, certain UI features may be re-rendered in a way that is undesirable to a viewing user.

To avoid UI movement that may be undesired to a user, a device may establish a threshold level of user/head movement, where if a user movement relative to a device is within the threshold for a certain period of time, the device enters a "still" mode. This threshold may be referred to as a "still mode start" threshold. If a user stays within the still threshold for a certain period of time, the device may determine that the user is actively engaging with the device (for example, reading content on the device) and thus the user may not wish the UI to change with small user movements (such as small head gestures, twitches, etc.). Thus, the still mode is activated. Thus, if the user remains sufficiently still for certain period of time, the device enters still mode. While the still mode is activated, the device will hold the UI in position and will not activate any UI movement that is based on user movement relative to the device. The still mode may be de-activated when movement of a user beyond a second threshold is detected. This second threshold may be referred to as a "still mode end" threshold. When movement is detected beyond the still mode end threshold, the device may determine that the user no longer desires the UI to remain still and thus UI movement based on user movement relative to the device may be reactivated. Both the still mode start threshold and still mode end threshold may be based on the head position of the user relative to the device, more specifically the thresholds may be based on the angle of the user's head relative to the plane of the display of the computing device. Thus the thresholds may be considered head movement thresholds. The thresholds and the corresponding functionality regarding the UI display may be deactivated during times when the UI is not activated (for example, the screen is blank or the device is in sleep mode) or during times when the UI is displaying content whose appearance does not depend on user position relative to the device (for example, while watching a pre-recorded video, etc.).

Figure 5C:
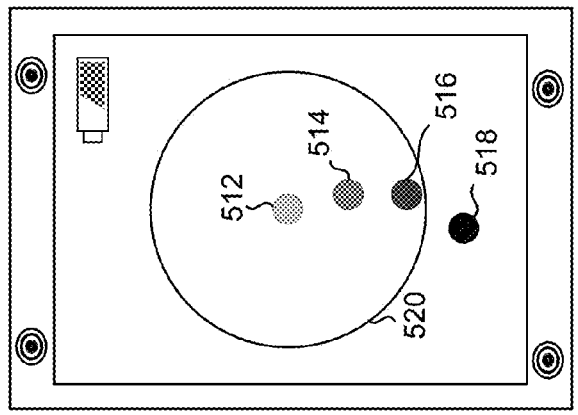
FIGS. 5A-5C illustrate stilling a UI based on user movement staying within certain thresholds according to one aspect of the present disclosure.
Figure 5B:
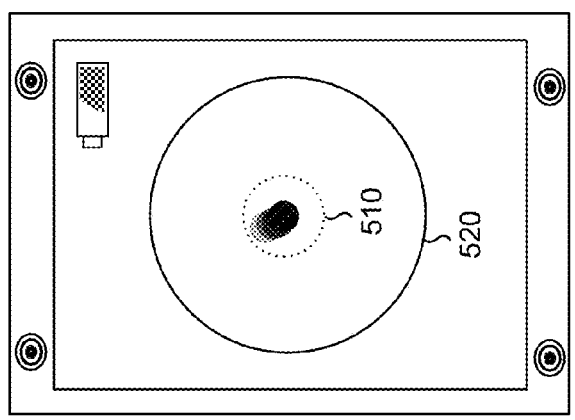
Figure 5A:
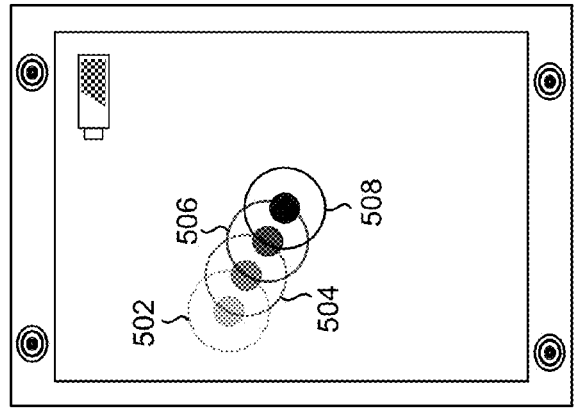

An example of behavior of the still mode is shown in FIGS. 5A-5B. A device may interpolate a user position (such as a head's distance and/or angular position) relative to the device using head tracking and other such techniques. FIG. 5A illustrates various interpolated head angular positions 502-508. The shading of 502-508 represents the travel of the head relative to the device as the head position may be interpolated by the device where the head travels from position 502 to position 504 to position 506 to position 508. The inner dots of 502-508 represent the interpolated head position and the outer rings represent the still mode start thresholds for each head position. As shown in FIG. 5A, as each head position is outside the still mode start threshold for the respective previous position, the still mode would not necessarily be triggered in the case of the head movement of FIG. 5A.

When the head movement has stayed within one of the still mode start thresholds for a determined period of time (i.e., x ms) then still mode will begin. Still mode operation is shown in FIG. 5B illustrating still mode start when the head has remained within the threshold of position 508 from FIG. 5A. Dotted circle 510 of FIG. 5B illustrates the still mode start threshold that was not exceeded. The shaded dots within circle 510 illustrate that the interpolated head positions stayed within the still mode start threshold for the determined period of time, leading to the activation of the still mode. Dotted circle 520 represents the still mode end threshold discussed above. If the interpolated head position exceeds the still mode end threshold, then the still mode would be de-activated. The actual thresholds 510 and 520 are adjustable depending on device configuration and may be different, may be the same, or may be based on other factors rather than interpolated head position (e.g., movement frequency rather than distance, etc.). For example, although illustrated as circles in FIGS. 5A-5C, the still mode start threshold and still mode end thresholds may be configured in variety of ways. The thresholds may be non-circular shapes, and thus dependent on a direction of head movement relative to the device to trigger a threshold. The thresholds may also be irregular, resulting in non-geometric shapes defining the thresholds relative to interpolated head movement. The thresholds may also be based on factors other than head movement when determining user movement relative to the device.

FIG. 5C illustrates deactivation of the still mode as the head positions 512, 514, 516, and 518 approach and then exceed still mode end threshold 520. Once the head position (518) exceeds the still mode end threshold, the still mode will end and the UI may resume its capability to adjust its appearance based on the user position relative to the device.

To avoid exiting the still mode due to undesired device movement (such as device movement caused by the bumps of riding a bus) the still mode end threshold 520 may be configured to be based on a movement category of the device. Example movement categories include stationary, walking, running, riding in an automobile, riding on a bicycle, riding on a bus, flying on a plane, riding in a boat, etc. As shown in FIG. 6, each movement category may be associated with a different still mode end threshold. Each individual threshold may be based on different factors. For example, one still mode end threshold may be based on if a user movement exceeds a certain distance from a resting movement. Another still mode end threshold may be based on if a user movement exceeds a certain frequency. For example, movement that exceeds 12 Hz in frequency is unlikely to be caused by a human and may be attributed to a vehicle, and thus included within the movement threshold such that vehicle movement will not cause the device to exit the still mode. Still other movement thresholds may be based on other factors, such as movement exceeding an established pattern causing the end of the still mode (for example a user on a boat traveling in a certain rhythm over waves) or movement of an extremely sudden manner to not end the still mode (for example to account for potential turbulence while in an airplane and to keep the turbulence from causing the device to exit the still mode).

The thresholds may be configured in a variety of ways. To determine the thresholds, it may be desirable to observe and/or calculate different movement signatures for the different movement categories. A movement signature may include a movement pattern representative of the movement category. These movement signatures may then be used to determine what kinds of movements are intentional (i.e., attributed to a user) and what kinds of movements are unintentional (i.e., attributed to the movement category).

Many different movement samples may be taken either as part of system training or during run time, for analysis in preparing movement signatures and incorporating them into the system. For example, device sensor output data may be recorded for multiple interactions with the device, where those interactions take place during different movement category situations (e.g., stationary, walking, climbing stairs, on a bus, etc.). The sensor output data may include output data of sensors such as those described in reference to FIG. 2, such as an accelerometer, gyroscope, compass, positioning system, or other sensors not explicitly mentioned above. The sensor output data in certain categories may be analyzed together to derive movement signatures that are associated with the specific movement categories. The system may consider both relative movement (that is movement of a user relative to a device) as well as spatial movement (i.e., device movement not relative to the user) when considering movement information to create movement signatures of different movement categories. For example, the system may consider how relative movement changes over a particular time to derive information that may assist in categorizing, and later recognizing and determining, a movement category. A movement category may be associated with multiple movement signatures and may even be divided into subcategories (for example, a subway train versus an inter-state train). A same kind of device may be used for taking movement samples or different devices may be used to determine signatures that may be applied across device types. In addition, movement categories/samples/signatures may include additional device setting/configuration information. For example, whether a device is connected to one or more other devices (for example, a Bluetooth connection with an automobile, a WiFi connection with an airplane network, etc.). Such other setting/configuration information may be used during runtime to identify a movement category and configure device operation (e.g., still mode thresholds) accordingly.

The system may employ machine learning techniques (such as boosted decision stumps or other techniques) to analyze and classify the different movement samples based on patterns, movement categories, and the like to arrive at movement signatures and/or desired thresholds. Other computational techniques, such as frequency filters may also be used. These techniques may assist in determining what factors may be used to incorporate into which thresholds, thus tailoring the threshold to the movement category. As discussed above, different threshold representations may take different shapes. Those shapes may be guided by device movement expected in each movement category. For example, a movement threshold associated with going up or down stairs may result in an elliptical representation of the threshold to account for normal rising and falling associated with traveling on stairs. Other movement categories may result in other thresholds. The thresholds may also be dynamic, and may be customized for particular users and updated during certain run time situations when a device is configured to dynamically adjust thresholds based on user behavior. The thresholds may incorporate different factors as appropriate such as time, distance, relative movement, movement frequency, movement direction, etc. based on the desired results of the individual thresholds.

Still mode operation may also be operated independently of the above thresholds. For example, if sudden movement of a device is detected, parallax operations may be automatically discontinued for a period of time or until the sudden movement stops, without necessarily referring to the described thresholds. Other examples are also possible where still mode operation is adjusted based on factors other than user movement relative to the device (for example, device movement irrespective of relative user movement, etc.).

When applying still mode techniques during runtime, a system may compare the movement of a device to available movement signatures to identify the movement category. Further, other techniques may be used to identify/eliminate potential movement categories. For example, if a device is determined to be traveling at over 300 miles-per-hour, the potential movement categories may be quickly narrowed down to airplane, rail, or other high speed travel. If the device's altitude is determined to be 15,000 feet above sea level, airplane travel may be selected as the movement category. For more other, more similar modes of travel (e.g., automobile v. bus v. commuter train, etc.) more specific analysis of the device's operating conditions may be performed. For example, the movement of the device (either stand alone or relative to a user) may be compared to one or more stored movement signatures to determine which movement signatures most closely correlate to the movement of the device. Data from other sensors (for example, microphone, camera, etc.), as well as other device operating conditions (for example, network connections), may also be analyzed to determine a movement category of the device. Other information, such as user behavior, user device history, etc. may be used to determine a movement category. For example, if a user purchases a plane ticket associated with a particular date and time, the system may indicate to one or more device(s) associated with the user that airplane travel may be taking place at the place and time. In another example, if a user purchases a bus pass, the user's device(s) may recognize that bus travel may be imminent. A wide variety of information may be used to determine a movement category. Once a movement category is determined, the device may then configure its still mode operation to match the selected movement category.

In this manner the system may configure different thresholds to filter out undesired movements from affecting the UI, thus improving the user experience. These different thresholds may be applied to configure the smooth mode end or smooth mode begin thresholds to customize the user experience based on the movement category applicable to a current operation of a device.

To improve the user experience further, a smoothing algorithm may be applied to smooth UI movement that occurs when a movement passes the still mode end threshold and the UI transitions from still mode to movement mode. For example, referring again to FIG. 5C, when the user's head is interpolated to be at position 518, the device will discontinue still mode and will resume operating the UI to depend on user movement. In doing so, the rendering engine 252 may re-render the UI based on the user's present position (i.e., 518) relative to the device. This may cause a sudden jump in UI appearance as the device may go from rendering the UI as if the user's head were at position 512 (while the device was in still mode) at one instant to rendering the UI for the user's head at position 518 the next (when still mode is exited). This jump in UI appearance may be undesirable.

To counter such a drastic jump a smoothing algorithm may be applied. The smoothing algorithm may gradually transition the UI appearance for the user's head position when still mode was activated (for example, 512) to the UI appearance for the new user head position after still mode was deactivated (for example, 518). The transition may occur over a time period sufficient to avoid a discontinuous effect to the user, for example a half-second, a second, or some other time period depending on factors such as difference in position, user preferences, UI layout, or other factors.

FIG. 7 illustrates an example algorithm for operating a device using a position based user interface (UI) according to one aspect of the present disclosure. The algorithm is an illustration, and other algorithms using different, reordered, and/or removed steps may also be used. The algorithm begins at block 702. The motion detection module 230 of device 110 may detect and determine (704) a movement category of the user 110 based on data from sensors 262, 264, 266 and/or other components and processing by the motion recognition engine 240 and/or pattern recognition engine 244). To identify a movement signature during device operation the motion recognition engine 240 may compare real-time motion data from the field sensors 264, inertial sensors 266, global positioning sensors 262, or the like against a set of movement signature models stored in storage 248, to allow a pattern recognition engine 244 to determine whether the current motion of the device 110 conforms to an identified movement signature. By applying motion recognition directly to the live data from the sensors, which may for example be sampled at a rate of milliseconds, physical motion may be quickly and accurately modeled and recognized. When a movement signature is identified, the device may then match the movement signature to a movement category based on the movement signature.

The device 110 determines (706) a head position of a user 102 relative to the device 110 using data from sensors such as camera(s) 106 and an image recognition engine 246. A rendering engine 252 of a device 110 then renders (708) a UI on display 212 based on a relative position of the user's head to the device 110. The motion detection module 230 may then check (710) to determine if a head position of the user 102 has remained still for a sufficient time to activate a still mode operation. When the head position has remained sufficiently still, the device 110 may enter (712) still mode and cause the rendering engine 252 to disable motion of the UI that depends on motion of the user relative to the device. When activating still mode, the device 110 may configure (714) the still mode end threshold based on the movement category. The device may then operate in still mode (716) using the configured still mode end threshold until the motion detection module 230 detects (718) head movement beyond the configured still mode end threshold. The device 110 may then discontinue (720) still mode operation. The rendering engine 252 may then smooth (722) the UI transition from its display in still mode to the UI display based on the new head position.

In addition to configuring still thresholds based on a movement category of a user or device, the movement category may otherwise be used to configure operation of a movement based UI. For example, the movement sensitivity of a movement based UI (that is, the sensitivity with which device/user movement causes movement in the UI) may be configured based on the movement category. Further certain types of UI movement may be exaggerated or reduced based on the movement category (for example, reducing the effect of sudden movements when traveling on an airplane). The UI may also be configured to detect gestures from a user, for example using touch interface 214 (such as for gestures that touch the device 110) and/or using camera(s) 106 (such as for gestures that do not touch the device 110). The detection of those gestures may be based on the movement category of the device, where gestures may be interpreted or processed differently based on the movement category. Other configurations of UI operation based on movement category are possible.

Referring to FIG. 8, different mobile devices 110a to 110e may contain different components of the system 100 and the devices may be connected over a network 802 to one or more servers 120. For example, the smart phone 110a, and/or tablet computer 110c may each include the image recognition engine 246, but the matching a movement signature to a movement category may be carried out using a pattern recognition engine 244 located at the server 120. In the same system, the laptop computer 110b may include the motion detection module 230 but may refer to storage 248 located at a remote server 120. Also in the same system, the augmented reality (AR) glasses 110b and smart watch 110e may include the rendering engine 252, but motion detection may be performed by the server 120. In one aspect, movement detected by one device (such as smart watch 110e) may be used to configure a UI on a different device.

The various aspects can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most aspects utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In aspects utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of aspects, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keypad, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a non-transitory computer-readable storage medium representing remote, local, fixed and/or removable storage devices as well as storage media for temporarily and/or more permanently containing, storing, and retrieving computer-readable information. The system and various devices also typically will include a number of software applications, modules, services or other elements located within at least one working memory device, including an operating system and application programs such as a client application or Web browser. It should be appreciated that alternate aspects may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer-readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various aspects.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   detecting a first angle of a head of a user relative to a display of a computing device at a first time, the first angle detected using head tracking;
   displaying a first rendering of an element of a graphical user interface of the computing device, the first rendering including a first virtual depth of the element, the first virtual depth based on the first angle;
   detecting movement of the computing device based on output data from sensors of the computing device;
   comparing the output data to stored movement data to identify a movement category of the computing device;
   identifying a movement category associated with the user walking as the movement category based at least in part on the comparing;
   configuring a head movement threshold based on the movement category associated with the user walking;
   detecting a second angle of the head at a second time, the second angle being relative to the display of the computing device and detected using head tracking, and the second time being after the first time;
   determining whether a change in angle of the head relative to the display of the computing device from the first position to the second position exceeds the head movement threshold, and:
      in response to the change in angle not exceeding the head movement threshold, continuing to display the first rendering of the element, or
      in response to the change in angle exceeding the head movement threshold, displaying a second rendering of the element of the graphical user interface, the second rendering including a second virtual depth of the element, the second rendering being different from the first rendering and the second virtual depth being based on the second angle.

2. The computer-implemented method of claim 1, in further response to the movement of the head exceeding the threshold, displaying an interim rendering of the element, wherein:
   the interim rendering of the element is based on an interim angle of the head relative to the display of the computing device, the interim angle being in between the first angle and second angle;
   the displaying of the interim rendering of the element occurs after the second time; and
   the displaying of the second rendering of the element occurs at a third time, the third time being after the second time.

3. The computer-implemented method of claim 1, further comprising, after displaying the second rendering:
   detecting further movement of the computing device based on further output data from sensors of the computing device;
   comparing the further output data to stored movement data to identify a second movement category of the computing device;
   identifying a movement category associated with the riding on a bus as the movement category based at least in part on the comparing;
   configuring a second head movement threshold based on the movement category associated with the user riding a bus;
   detecting a third angle of the head at a third time, the third angle being relative to the display of the computing device and detected using head tracking, and the third time being after the second time;
   determining whether a second change in angle of the head relative to the display of the computing device from the second position to the third position exceeds the second head movement threshold, and:
      in response to the second change in angle not exceeding the second head movement threshold, continuing to display the second rendering of the element, or
      in response to the second change in angle exceeding the second head movement threshold, displaying a third rendering of the element of the graphical user interface, the third rendering including a third virtual depth of the element, the third rendering being different from the second rendering and the third virtual depth being based on the third angle.

4. A computing system, comprising:
   a display;
   at least one memory; and
   at least one processor coupled to the at least one memory, the at least one processor being configured:
      to detect a first angle of a plane of the display relative to a head at a first time;
      to present a first rendering of an element of a graphical user interface on the display, wherein the first rendering is based at least in part on the first angle;
      to determine a movement category of the computing device;
      to determine a movement threshold based on the movement category;
      to detect a second angle of the plane of the display relative to the head at a second time, the second time being after the first time; and
      to determine whether a movement of the head from the first angle to the second angle exceeds the movement threshold, and wherein:
         in response to the movement not exceeding the movement threshold, continuing to present the first rendering, or
         in response to the movement exceeding the movement threshold, to present a second rendering of the element, the second rendering based at least in part on the second angle and the movement category.

5. The computing system of claim 4, wherein the at least one processor is further configured to, in further response to the movement of the head exceeding the threshold, display an interim rendering of the element, wherein:
   the interim rendering of the element is based on an interim angle of the plane of the display relative to the head, the interim angle being in between the first angle and second angle;
   the display of the interim rendering of the element occurs after the second time; and
   the display of the second rendering of the element occurs at a third time, the third time being after the second time.

6. The computing system of claim 4, wherein the first rendering of the element includes a rendering of a virtual depth of the element relative to the plane of the display, wherein the rendering of the virtual depth is based at least in part on the first angle.

7. The computing system of claim 4, wherein the at least one processor is further configured to determine whether the movement of the head exceeds the movement threshold based on a comparison of a first angle to the second angle.

8. The computing system of claim 4, wherein the at least one processor is configured:

to detect movement of the computing device using output from sensors of the computing device; and to determine the movement category based on the output from the sensors.

9. The computing system of claim 8, wherein the at least one processor is configured:
- to determine a movement signature based on the output from the sensors; and
- to determine a movement category based on the movement signature.

10. The computing system of claim 9, wherein the at least one processor is configured to store an association between the movement signature and the movement category.

11. A non-transitory computer-readable storage medium storing processor-executable instructions for controlling a computing device having a display, comprising program code to configure the computing device:
- to detect a first angle of a plane of the display relative to a head at a first time;
- to present a first rendering of an element of a graphical user interface on the display, wherein the first rendering is based at least in part on the first angle;
- to determine a movement category of the computing device;
- to determine a movement threshold based on the movement category;
- to detect a second angle of the plane of the display relative to the head at a second time, the second time being after the first time; and
- to determine whether a movement of the head from the first angle to the second angle exceeds the movement threshold, and wherein:
  - in response to the movement not exceeding the movement threshold, continuing to present the first rendering, or
  - in response to the movement exceeding the movement threshold, to present a second rendering of the element, the second rendering based at least in part on the second angle and the movement category.

12. The non-transitory computer-readable storage medium of claim 11, wherein the program code further configures the computing device to, in further response to movement of the head exceeding the threshold, display an interim rendering of the element, wherein:
- the interim rendering of the element is based on an interim angle of the plane of the display relative to the head, the interim angle being in between the first angle and second angle;
- the display of the interim rendering of the element occurs after the second time; and
- the display of the second rendering of the element occurs at a third time, the third time being after the second time.

13. The non-transitory computer-readable storage medium of claim 11, wherein the first rendering of the element includes a rendering of a virtual depth of the element relative to the plane of the display, wherein the rendering of the virtual depth is based at least in part on the first angle.

14. The non-transitory computer-readable storage medium of claim 11, wherein the second rendering of the element includes a rendering of a virtual depth of the element relative to the plane of the display, wherein the rendering of the virtual depth is based at least in part on the second angle.

15. The non-transitory computer-readable storage medium of claim 11, wherein the program code further configures the computing device to determine whether the movement of the head exceeds the movement threshold based on a comparison of a first angle to the second angle.

16. The non-transitory computer-readable storage medium of claim 11, wherein the program code further configures the computing device:
- to detect movement of the computing device using output from sensors of the computing device; and
- to determine the movement category based on the output from the sensors.

17. The non-transitory computer-readable storage medium of claim 16, wherein the program code further configures the computing device:
- to determine a movement signature based on the output from the sensors; and
- to determine a movement category based on the movement signature.

18. The non-transitory computer-readable storage medium of claim 17, wherein the program code further configures the computing device to store an association between the movement signature and the movement category.

* * * * *